(12) United States Patent
Ingallinera

(10) Patent No.: US 6,579,005 B2
(45) Date of Patent: Jun. 17, 2003

(54) UTILIZATION OF PYROMETER DATA TO DETECT OXIDATION

(75) Inventor: Michael David Ingallinera, Latham, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/751,345

(22) Filed: Dec. 28, 2000

(65) Prior Publication Data

US 2002/0122458 A1 Sep. 5, 2002

(51) Int. Cl.⁷ .............................. G01K 1/12; G01J 5/08
(52) U.S. Cl. .................... 374/45; 374/144; 374/148; 374/102; 374/111; 374/112; 374/116; 374/4; 374/131; 374/166; 374/179; 356/43
(58) Field of Search .......................... 374/45, 57, 101, 374/102, 104, 110, 111, 112, 116, 120, 121, 124, 129, 130, 131, 141, 144, 147, 148, 163, 166, 179, 4; 356/43, 45; 73/116, 117.3, 119 R

(56) References Cited

U.S. PATENT DOCUMENTS

| | | | |
|---|---|---|---|
| 3,584,509 A | * 6/1971 | Compton et al. | 374/144 |
| 3,592,061 A | * 7/1971 | Schwedland et al. | 374/144 |
| 3,623,368 A | * 11/1971 | Decker, Jr. | 374/144 |
| 3,855,864 A | * 12/1974 | Douglas | 374/107 |
| 4,582,426 A | 4/1986 | Douglas | 356/43 |
| 4,644,162 A | * 2/1987 | Bantel et al. | 374/5 |
| 4,647,220 A | * 3/1987 | Adams et al. | 374/5 |
| 4,648,711 A | 3/1987 | Zachary | 356/44 |
| 4,722,609 A | * 2/1988 | Epstein et al. | 374/185 |
| 4,787,053 A | 11/1988 | Moore | 701/123 |
| 4,984,239 A | 1/1991 | Suzuki et al. | 714/703 |
| 5,067,355 A | 11/1991 | Witte | 73/352.326 |
| 5,203,632 A | 4/1993 | Fisher et al. | 374/144 |
| 5,265,036 A | 11/1993 | Suarez-Gonzalez et al. | 702/134 |
| 5,265,410 A | 11/1993 | Hisatome | 60/39.12 |
| 5,306,088 A | * 4/1994 | Zoerner | 374/131 |
| 5,536,143 A | 7/1996 | Jacala et al. | 416/96 R |
| 5,740,668 A | 4/1998 | Fujiwara et al. | 60/805 |
| 5,819,094 A | 10/1998 | Sato et al. | 717/131 |
| 5,838,588 A | 11/1998 | Santoso et al. | 700/287 |
| 5,867,977 A | 2/1999 | Zachary et al. | 60/39.53 |
| 5,930,990 A | 8/1999 | Zachary et al. | 60/39.53 |
| 6,109,783 A | * 8/2000 | Dobler et al. | 374/131 |

FOREIGN PATENT DOCUMENTS

| | | | | |
|---|---|---|---|---|
| GB | 2104958 A | * | 3/1983 | |
| GB | 2130717 A | * | 6/1984 | 374/144 |
| GB | 2133877 A | * | 8/1984 | 374/144 |
| GB | 2133878 A | * | 8/1984 | 374/144 |

OTHER PUBLICATIONS

Hoeft and Gebhardt, "Heavy–Duty Gas Turbine Operating and Maintenance Considerations," GE Energy Services product pamphlet No. GER–3620F (1998) (No Month).
"Transient Thermographic NDE of Turbine Blades", X. Maldague, P. Cielo, D. Poussart, D. Craig and R. Bourret, SPIE vol. 1313 Thermosense XII (1990), pp. 161–171.*

* cited by examiner

Primary Examiner—Diego Gutierrez
Assistant Examiner—Stanley J. Pruchnic, Jr.
(74) Attorney, Agent, or Firm—Banner & Witcoff, Ltd.

(57) ABSTRACT

A method for determining oxidation in turbine buckets allows for conditional based maintenance of the turbine buckets. The method includes measuring a temperature of a turbine bucket and comparing the measured temperature to a temperature of a reference turbine bucket to determine the condition of the bucket. The method provides useful temperature data to determine if the turbine should be stopped and the bucket serviced. This method may be used in place of interval based maintenance to increase bucket life, reduce bucket failure, and increase turbine operating time.

21 Claims, 8 Drawing Sheets

UTILIZATION OF PYROMETER DATA TO DETECT OXIDATION

FIELD OF INVENTION

This invention generally relates to turbine buckets. More specifically, the invention relates to a method for determining conditional based maintenance of first stage turbine buckets.

BACKGROUND OF THE INVENTION

A gas turbine engine is an air-dependent device that uses exhaust-gas-driven turbine wheels to drive a compressor, making continuous operation of the engine possible. Turbines extract kinetic energy from the expanding gases as the gases exit from the burners. The turbines convert this energy into shaft horsepower to drive the compressor and engine accessories. Turbines typically used for power generation are comprised of multiple stages, each stage having fixed partitions and a plurality of turbine buckets, also known as blades, mounted on rotatable turbine wheels.

Turbines are subjected to high speeds and high temperatures. These high speeds result in high centrifugal forces. Turbines must operate close to temperature limits that, if exceeded, lower the strength of the materials used to form the turbine components. Turbine buckets undergo distortion or lengthening known as "creep." Creep, which is a cumulative condition, refers to stretching or elongation of the bucket. The rate of creep is determined by the load imposed on the turbine, and the strength of the bucket. The strength of the bucket is in turn determined by the temperature within the turbine. Since changes in pitch and creep are more pronounced if engine operating limits are not respected, the temperature and RPM limits stipulated by the manufacturer must be followed.

The turbine assembly is made of two main parts: the disc or wheel, and the buckets or blades. The disc or wheel is a statically and dynamically balanced unit of specially alloyed steel. It usually contains large percentages of chromium, nickel, and cobalt. After forging, the entire surface of the disc is machined and carefully inspected using X-rays, magnetism, and other inspection methods to ensure its structural integrity. The buckets are forged from highly alloyed steel, and are carefully machined and inspected before being certified for use. The buckets are attached to the disc by means of a fir tree design to allow for different rates of expansion between the disc and the buckets, while still holding the bucket firmly against centrifugal loads. The bucket is kept from moving axially either by rivets, special locking tabs or devices, or another turbine stage.

It is possible that oxidation of turbine buckets may occur through normal usage. This oxidation may lead to decreased bucket life and subsequent failure of the turbines. First stage turbine bucket leading edge oxidation reflects local overheating that can cause early coating depletion and can cause base metal attack. Since welding in the airfoil section is prohibited, these processes can lead to early retirement of buckets if not discovered before base metal attack occurs. Experience has shown that first stage turbine buckets may develop leading edge oxidation at the first hot gas path interval inspection. However, a large variability exists in the amount of oxidation that may develop between buckets in a given unit. Some buckets having oxidation only require stripping and recoating, while other buckets are irreparable and must be replaced with new buckets.

Current methods used to determine bucket failure are not ideal. Generally, turbine buckets are inspected at specified intervals. These intervals are based on a combination of fired starts and fired hours. Inspection requires stopping the turbine and determining if the bucket needs to be refurbished or even replaced. This method of maintenance has become known as interval based maintenance.

There exists a need in the art for a method to predict if a bucket requires servicing. This method should provide for monitoring of the bucket without inspection, while the turbine is in operation. The method should also provide a better understanding of the impact of local temperature uncertainties. A better understanding of temperature uncertainties would lead to the ability to predict bucket failure.

BRIEF SUMMARY OF THE INVENTION

In accordance with certain preferred aspects, a method is provided for conditional based maintenance of first stage turbine buckets. The method allows for monitoring of the buckets during operation of the turbine. The method comprises monitoring one or more parameters that are indicative of bucket failure. These parameters may include temperature, oxidation of the buckets, reduction in power output, irregular operation, or other parameters indicative of turbine and turbine bucket failure. Preferably, oxidation of the buckets is indirectly monitored. More preferably, oxidation of the buckets is indirectly monitored by monitoring the temperature of the turbine buckets to determine the condition of the buckets. Most preferably, the temperature of a turbine bucket is measured and compared with the temperature of a reference turbine bucket that has no oxidation. The comparison of the temperature of the turbine bucket with the temperature of the reference bucket is known as relative temperature measurement.

As used herein, conditional based maintenance means maintenance of a component based on the condition of the component. Therefore, unlike the interval based maintenance discussed above, conditional based maintenance occurs when one or more parameters indicate that the turbine bucket requires maintenance. Conditional based maintenance offers several advantages over interval based maintenance. For example, often during interval based maintenance, it is found that the turbine components do not require maintenance and, therefore, the turbine was shut down unnecessarily. Conditional based maintenance prevents unnecessary shut down of the turbine and, thus, provides increased operating time for the turbine.

As used herein, the term relative temperature measurement means that the temperature of a turbine bucket is measured and compared with a reference turbine bucket, which has no oxidation. The bucket having no oxidation acts as a control, baseline, or reference for all measurements. The baseline also normalizes measurements that are made on different days.

In accordance with preferred embodiments, an analytical procedure that utilizes a temperature sensor to calculate relative temperature data is described herein. More preferably, optical pyrometer temperature data is used to calculate relative temperature data. The relative temperature data is used as an indicator of the initiation and spread of oxidation on the leading edge of first stage turbine buckets, and increases operating time of the turbine.

Advantages of this invention include a method for determining when a bucket needs servicing based on an analysis of data obtained while the turbine is operating, instead of using interval based servicing, which requires shutdown of the turbine. Using this method can reduce the number of buckets that are irreparable as a result of extensive oxidation, and increase operating time of the turbine.

BRIEF DESCRIPTION OF THE DRAWINGS

These and other features and advantages of the present invention will become more apparent in view of the following detailed description in conjunction with the accompanying drawings, of which.

DETAILED DESCRIPTION OF THE INVENTION

Numerous embodiments of the present invention are possible and will be apparent to those skilled in the art given the benefit of this disclosure. The detailed description herein, for convenience, will focus on certain illustrative and exemplary embodiments.

In accordance with preferred embodiments, a method is provided to predict intervals for servicing first stage turbine buckets. This method may be based on numerous parameters including oxidation of the buckets, reduction in power output, irregular operation, and other parameters indicative of turbine and turbine bucket failure. Most preferably, the oxidation data is obtained from temperature measurements using a temperature sensor such as a pyrometer. One skilled in the art would recognize that other devices, such as thermometers, thermocouples, or other devices that measure resistance and convert the resistance to a temperature value, may be used to determine the temperature within the bucket.

In accordance with preferred embodiments, pyrometer data can be used to detect and track oxidation of the buckets. The data obtained from the pyrometer measurements are evaluated using a technique of relative temperature measurement. Relative temperature measurement is performed using temperature data from a bucket that has no oxidation at the leading edge or mid chord locations. The temperature data obtained from a bucket without oxidation is used as a baseline, and is subtracted from all other temperature data to obtain relative temperature data.

Figure 1:
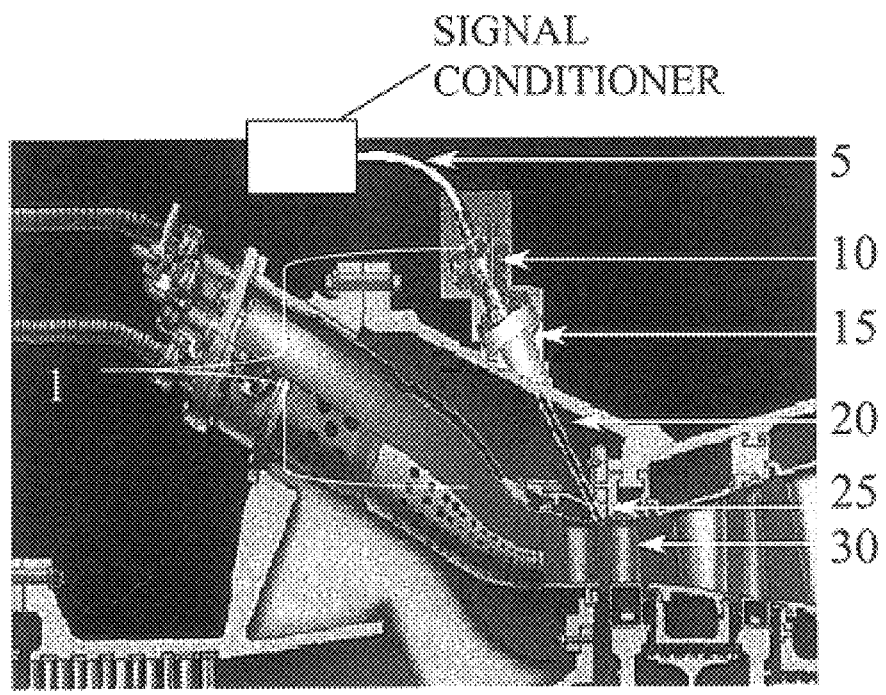
FIG. 1 is a section view of an optical pyrometer system in accordance with the present invention that may be used to acquire temperature data, shown installed on a turbine.

In preferred embodiments, any optical pyrometer system, such as the optical pyrometer system TBTMS Thermometer manufactured by Land Instruments International, may be used to acquire pyrometer temperature data from the first stage turbine buckets of a gas turbine. In an especially preferred embodiment, as seen in FIG. 1, a pyrometer 1 has a fiber optic light guide cable 5 that provides a light transmission path for the pyrometer. Pyrometer 1 further includes an optic head and a pressure proof sight glass mounting assembly 10 that isolates pyrometer 1 from the internal gas turbine environment. Radiation energy collected by optic head is transmitted along a fiber optic light guide (not shown) to a signal conditioner (not shown) that is mounted away from the hostile gas turbine environment. The signal conditioner may be any combination of detector and electronics that convert the radiant energy to a linear current output that is proportional to temperature. The pyrometer is mounted on a modified manway cover 15 on the turbine case with a boss on which the sight glass assembly 10 is mounted. A sight tube 20 is installed between manway cover 15 and a first stage nozzle retaining ring 25. Pyrometer 1 is used to measure the temperature within a first stage turbine bucket 30.

Figure 2:
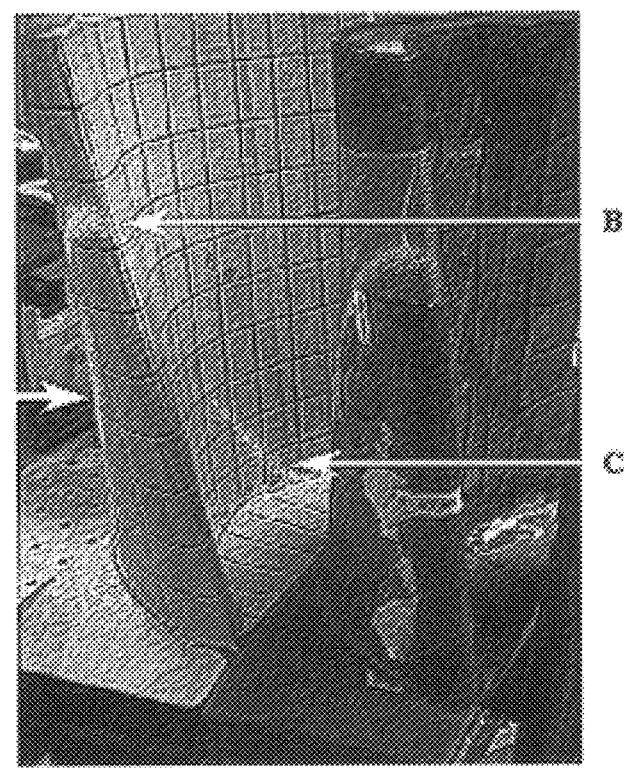
FIG. 2 is a perspective view showing the line of sight viewed by the pyrometer of FIG. 1.

In this especially preferred embodiment, pyrometer 1 views a continuous line of sight path A-B-C, as shown in FIG. 2. The path traverses from the suction side of the turbine bucket airfoil up to the leading edge at approximately a 70% span, jumps across part of the pressure side hidden by the curvature of the bucket, and then diagonally down the pressure side of the airfoil to the bucket platform.

Figure 3:
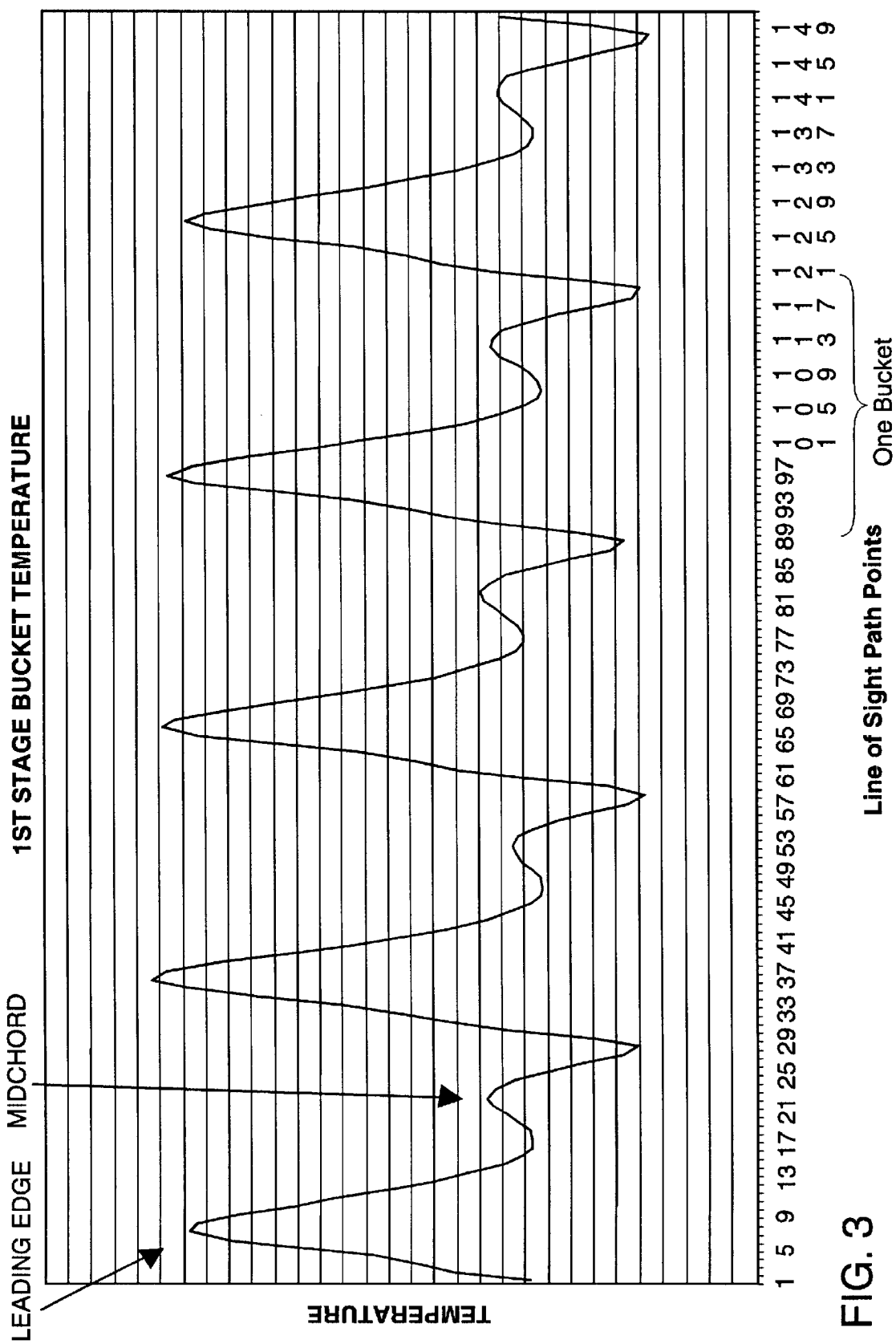
FIG. 3 is a graph showing the leading edge and mid chord temperature profile of a turbine bucket, as observed by the pyrometer of FIG. 1.

Referring to the graph shown in FIG. 3, typical temperature patterns observed by the pyrometer as the buckets rotate through the pyrometer's line of sight are shown. The mid chord peak in temperature is related to a mid chord cooling passage rib that runs radially up the interior of the bucket (not shown). A key phaser sensor is installed on all first stage gas turbines to detect a slot (not shown) that is machined in the forward stub shaft. Since there is a fixed physical relationship between the key phaser slot and the first stage buckets, the key phaser signal is used so that individual bucket temperature patterns can be readily referenced back to each bucket in the stage. This key phaser signal allows temperature data, operating gas turbine history, and individual bucket conditions to be correlated to the appropriate bucket.

Figure 4:
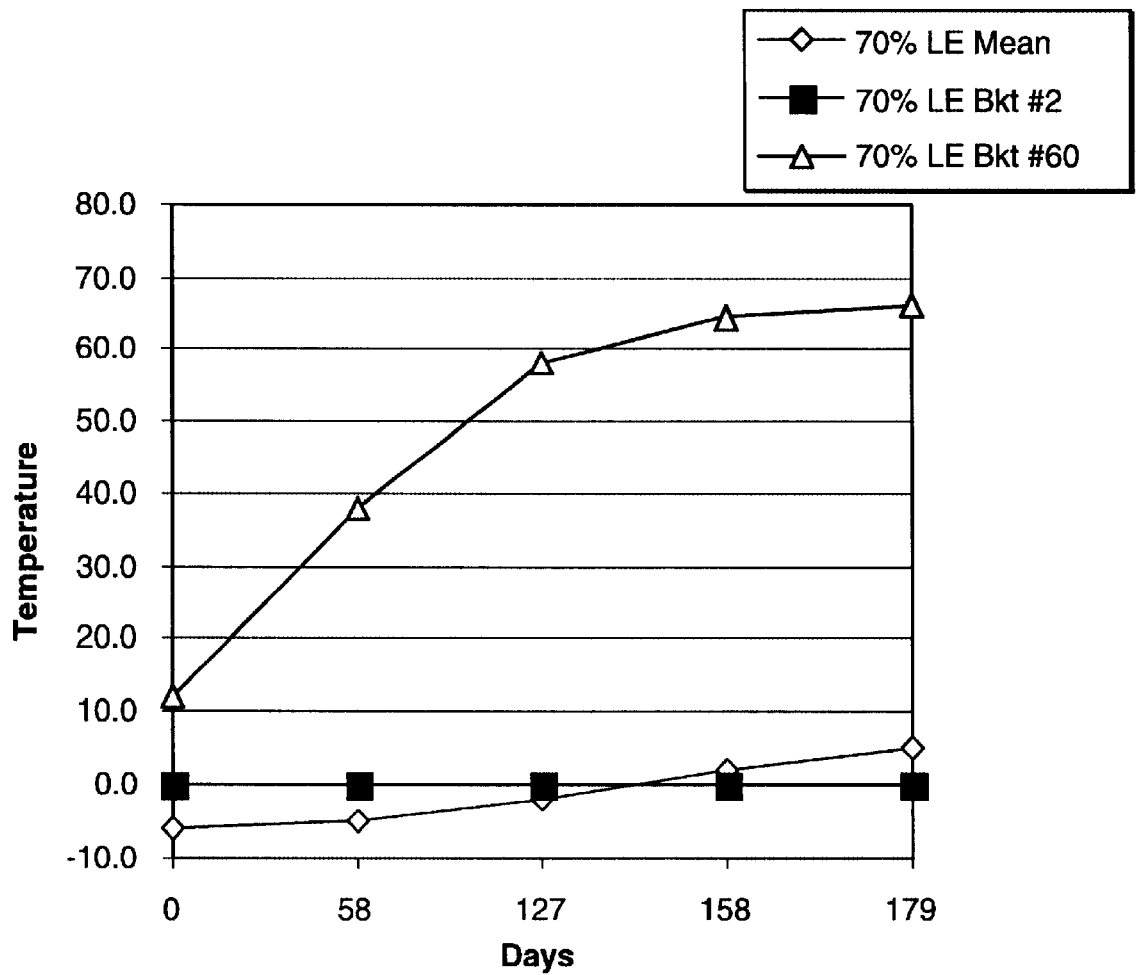
FIG. 4 is a graph showing the relative leading edge temperature of a bucket with oxidation and a bucket without oxidation, as observed by the pyrometer of FIG. 1.
Figure 5:
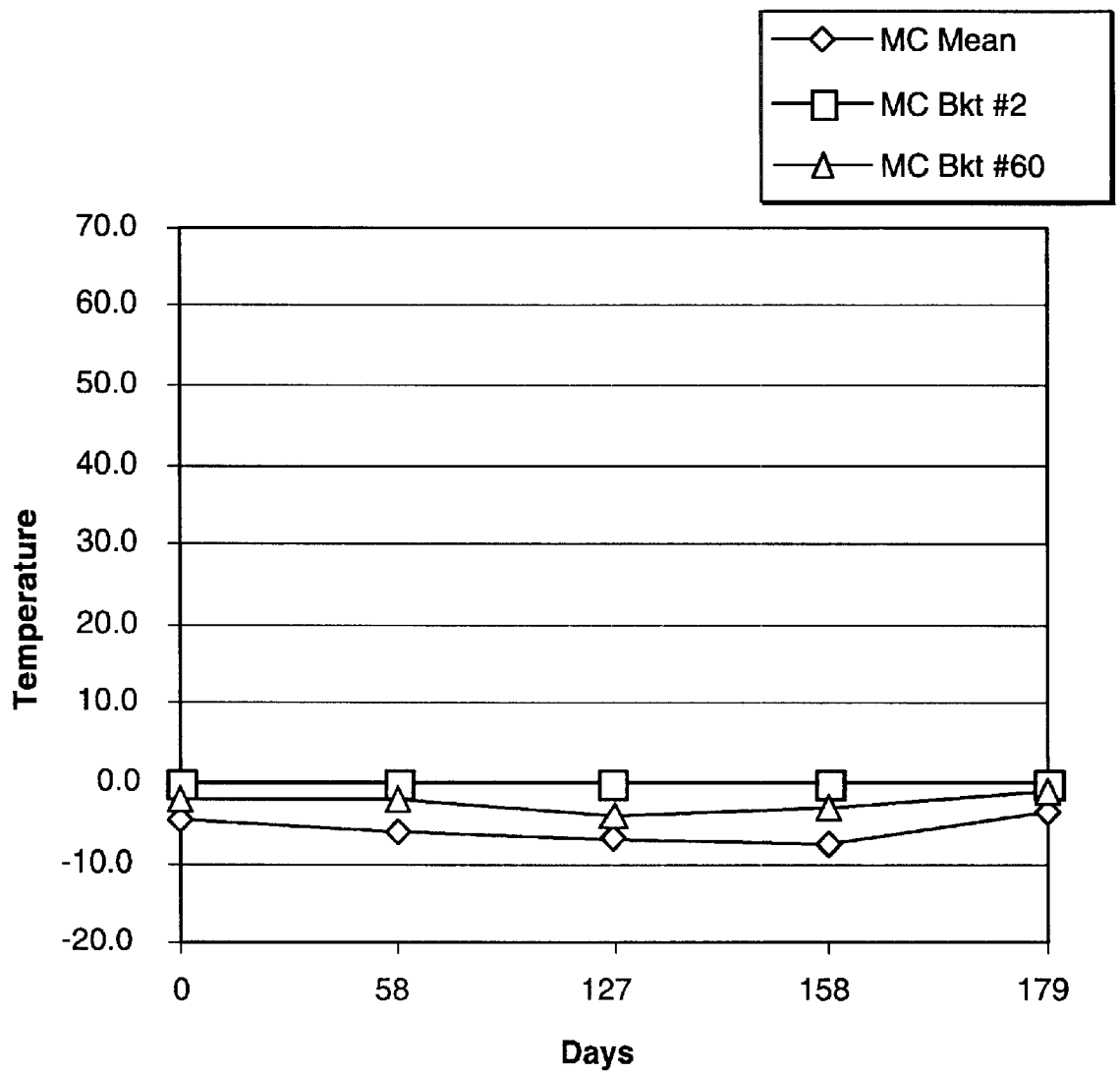
FIG. 5 is a graph showing the relative mid chord temperature of a bucket with oxidation and a bucket without oxidation, as observed by the pyrometer of FIG. 1.

In accordance with preferred embodiments, a test bucket 60 (Bkt #60), which contained large amounts of oxidation at its leading edge, and a reference bucket 2 (Bkt #2), which contained no oxidation, were used to determine relative temperatures at the leading edge and the mid chord of each bucket. Referring to FIGS. 4 and 5, relative temperature data of leading edge temperatures and mid chord temperatures, respectively, are shown. At the leading edge location, as seen in FIG. 4, the relative temperature trend for bucket 60 increases after day 0 and then starts to plateau with increasing elapsed time. This leveling off or plateau effect is an indication of the initiation and spread of oxidation. The leading edge temperature of bucket 2 remains constant over the entire period from 0 to 179 days, as can be seen in FIG. 4. At the mid chord location, where bucket 60 has no indication of oxidation, the relative temperature time trends for buckets 2, 60 track fairly well and reasonable level over the period, as seen in FIG. 5. Therefore, it can be seen than increase in temperature, followed by a plateau, reflects increased oxidation.

Figure 6:
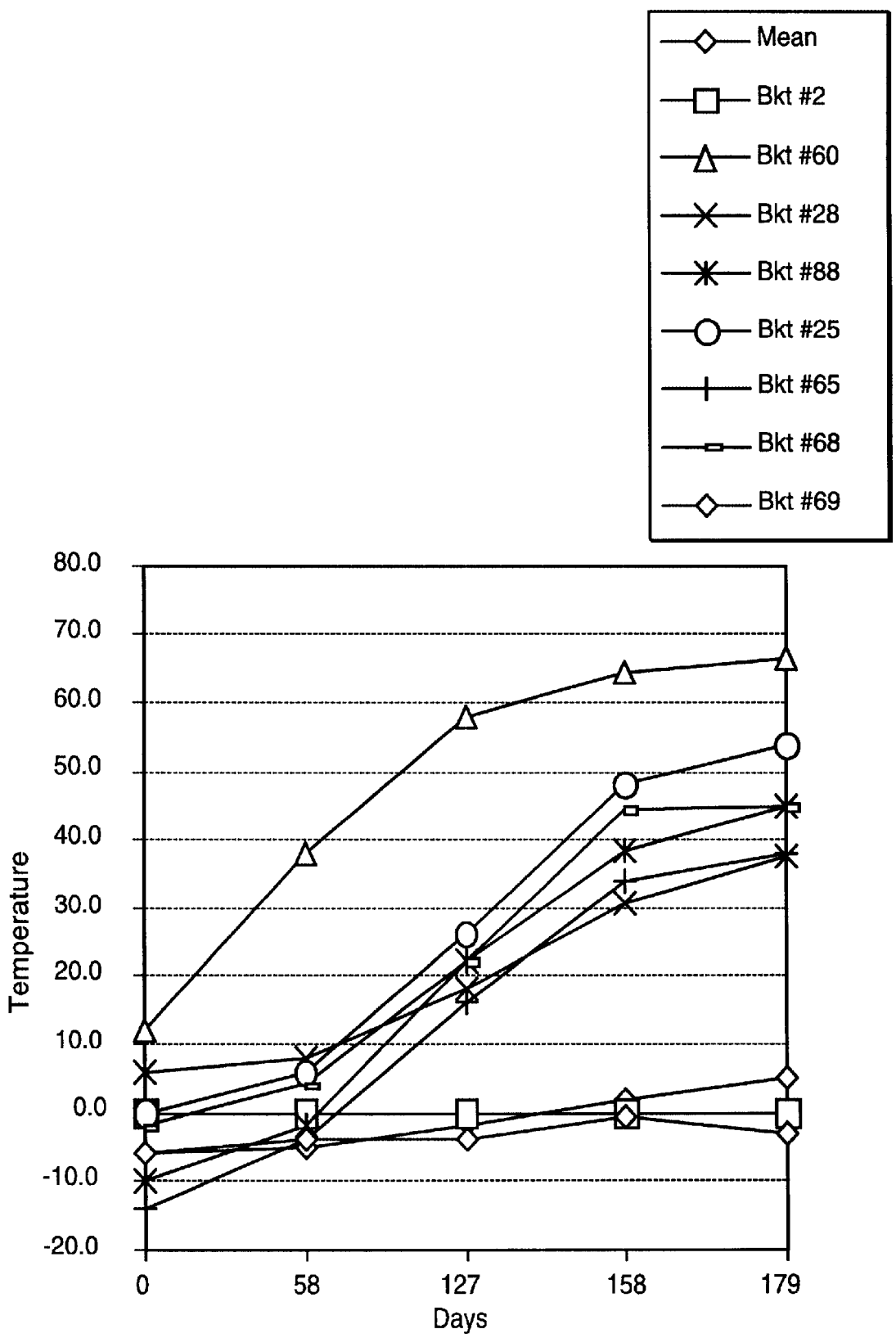
FIG. 6 is a graph showing the relative leading edge temperature of several buckets, as observed by the pyrometer of FIG. 1.

To determine further if the leveling off or plateau effect was a good indicator of oxidation, temperature measurements for a series of buckets were performed as seen in FIG. 6. Buckets 2 and 69 had no indication of oxidation at their leading edge, while buckets 25, 28, 65, 68, and 88 had significant oxidation at their leading edge. A summary of the buckets is shown in Table I,

| Bucket Number | Characteristics at Leading Edge |
|---|---|
| 2 | No Oxidation |
| 25 | Oxidation |
| 28 | Oxidation |
| 60 | Oxidation |
| 68 | Oxidation |
| 69 | No Oxidation |
| 88 | Oxidation |

Figure 7:
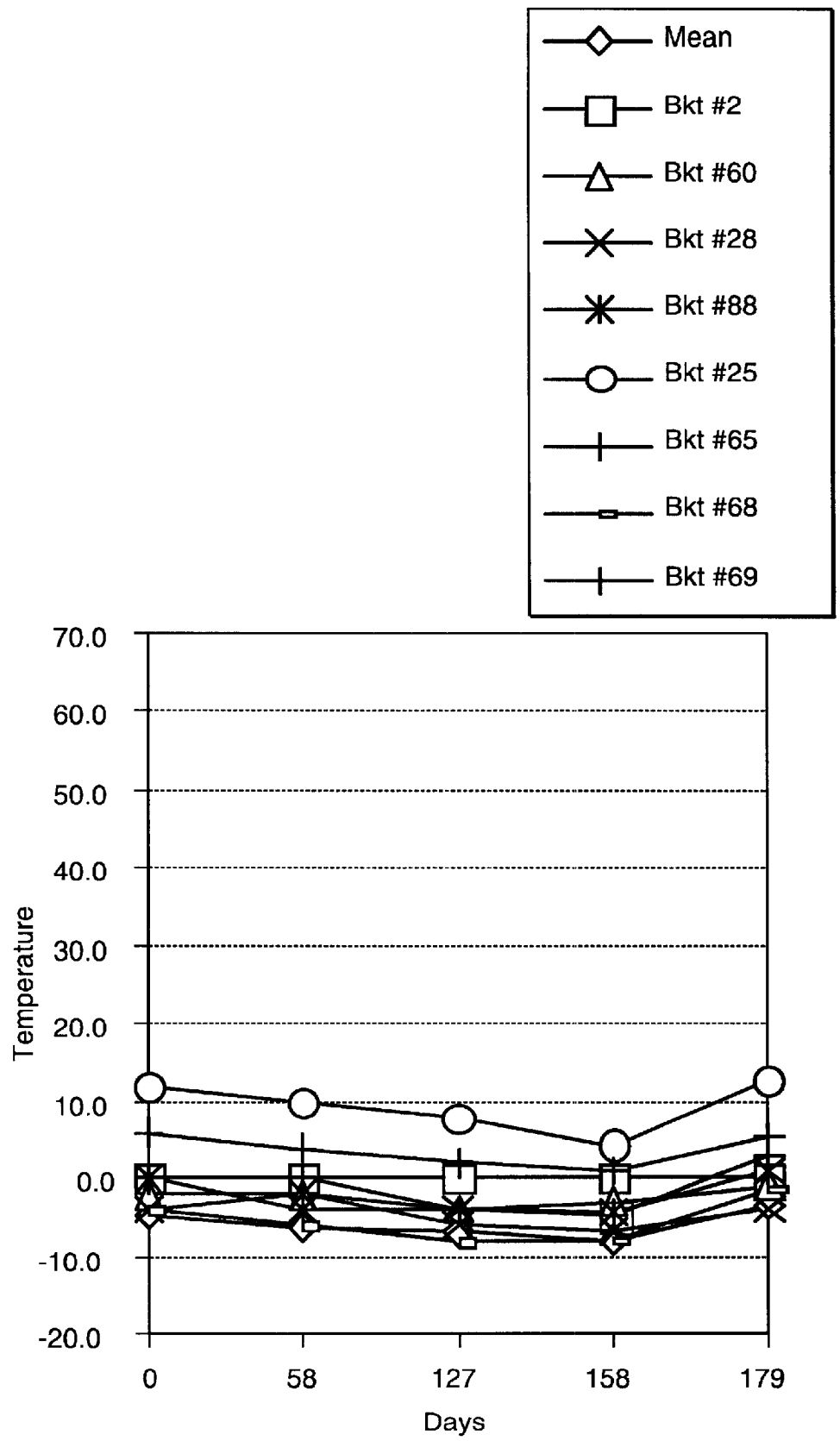
FIG. 7 is a graph showing the mid chord temperature of several buckets, as observed by the pyrometer of FIG. 1.

It can be seen that the leading edge relative temperatures of buckets 2 and 69 were essentially constant over the period from 0 to 179 days. Buckets 25, 28, 65, 68, and 88, however, show increases in temperature similar to one another, over the period of 0 to 179 days. As seen in FIG. 7, measurements at the mid chord location, where there is little indication of oxidation on any of the buckets, shows that the relative temperature trends tracked consistent and fairly level over the period.

The process of selecting a bucket to use as the reference in calculating relative temperature is accomplished by evaluating the temperature distribution of each bucket. The temperature difference of each bucket may be compared with the mean temperature. An ideal reference bucket comprises a bucket with a difference from the mean temperature (DMT) at the leading edge location that is essentially zero (i.e. is constant over the entire measurement period). The reference bucket must also be monitored to insure that over time its DMT does not increase.

Figure 8:
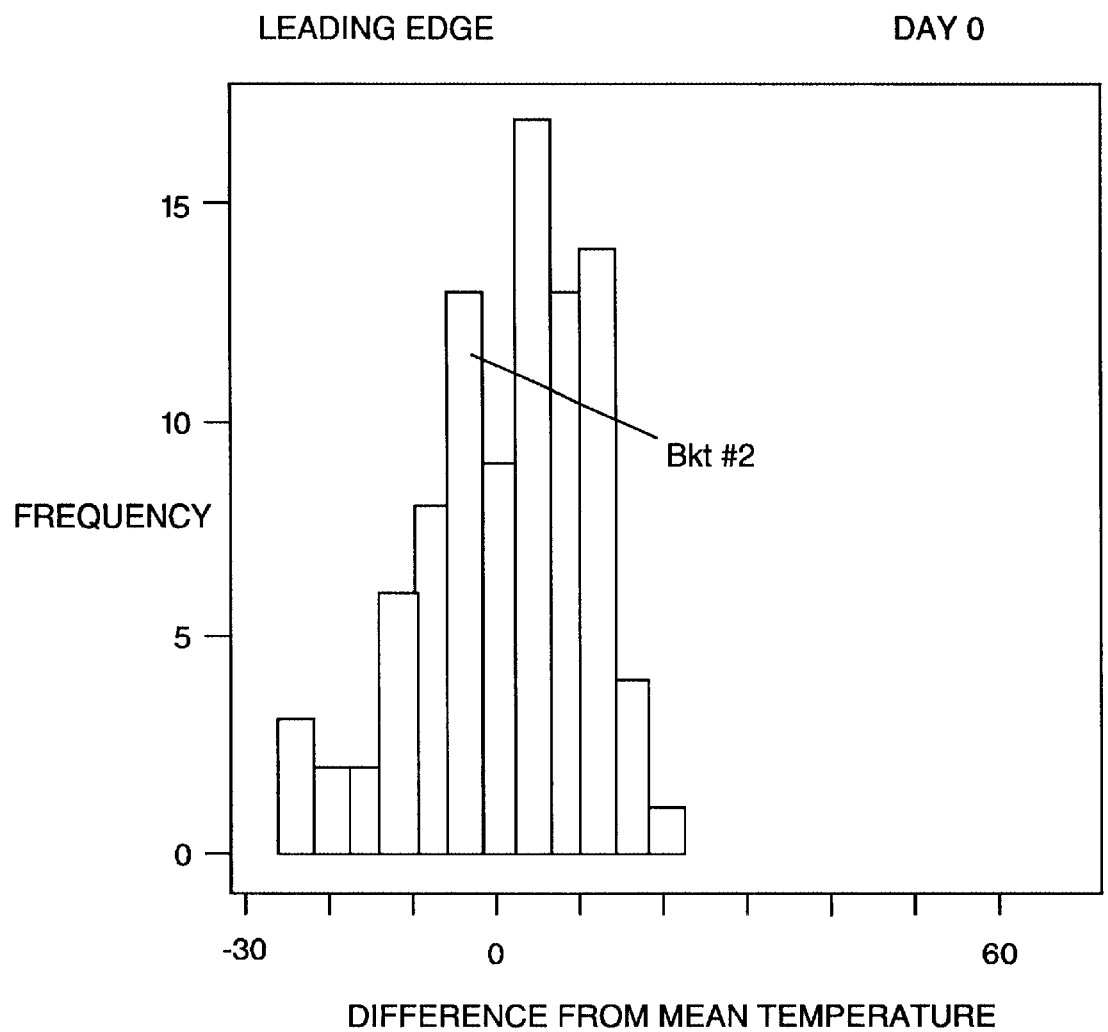
FIG. 8 is a graph showing the difference in mean temperature at day 0, as observed by the pyrometer of FIG. 1.
Figure 9:
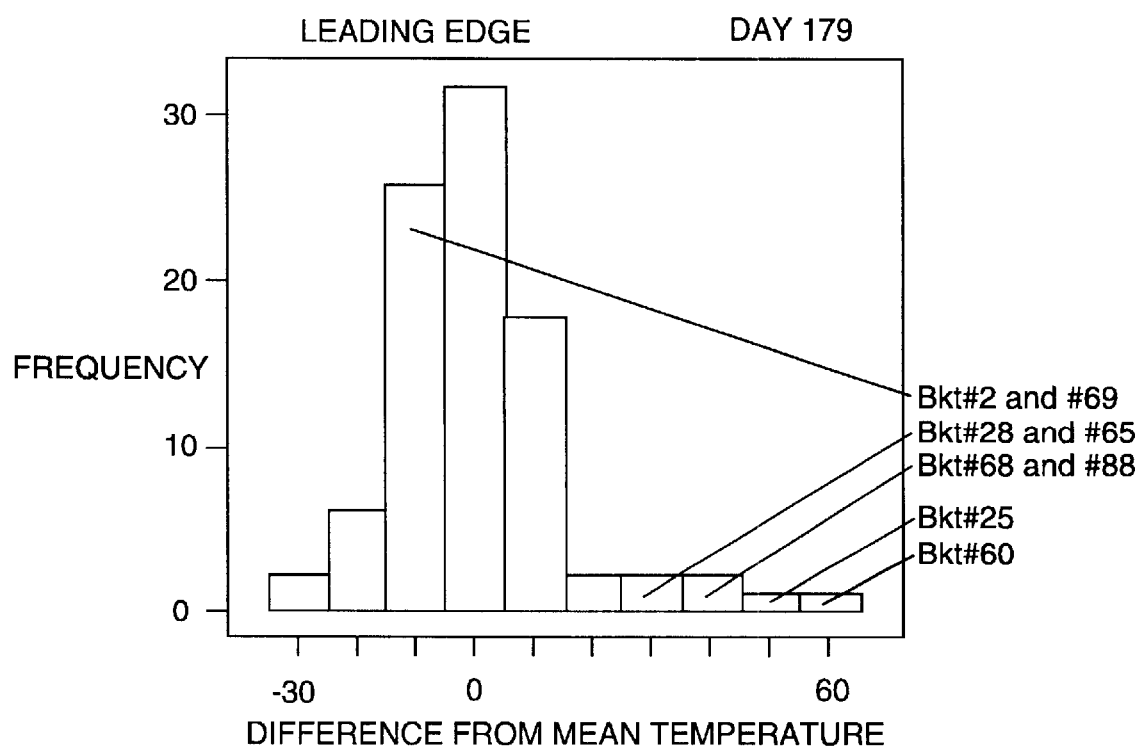
FIG. 9 is a graph showing the difference in mean temperature at day 179, as observed by the pyrometer of FIG. 1.

Referring to FIGS. 8 and 9, the DMT for buckets 2 and 69 remain fairly stable over the 180 day time interval, since only an 8–10 degree DMT is observed at days 0 and 179. The DMT for buckets 25, 28, 60, 65, 68 and 88 increase as a result of oxidation. Therefore, the condition of the reference bucket may be also monitored to ensure that accurate relative temperature measurements are obtained.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. A method for monitoring a condition of a turbine bucket, comprising the steps of:
inserting a temperature sensor into a turbine; measuring, with the temperature sensor, a temperature of a reference turbine bucket; measuring, with the temperature sensor, at least one temperature of a turbine bucket being monitored, and
comparing the measured temperature of the turbine bucket being monitored to the measured temperature of the reference turbine bucket to determine the condition of the turbine bucket being monitored.

2. The method of claim 1, further comprising the step of:
subtracting the temperature of the reference turbine bucket from the temperature of the turbine bucket being monitored to obtain a relative temperature of the turbine bucket being monitored.

3. The method of claim 2, wherein the relative temperature is monitored to determine when the turbine bucket being monitored needs servicing.

4. The method of claim 2, wherein a temperature of a leading edge of the turbine bucket being monitored is monitored.

5. The method of claim 2, wherein a temperature of a leading edge of the reference bucket is monitored.

6. The method of claim 3, wherein the turbine bucket being monitored requires servicing when the relative temperature initially increases and then levels off.

7. The method of claim 1, wherein the steps of measuring are performed with at least one temperature sensor.

8. The method of claim 7, wherein the at least one temperature sensor is selected from the group consisting of a pyrometer, a thermocouple, and a thermometer.

9. The method of claim 7, wherein the at least one temperature sensor is a pyrometer.

10. The method of claim 9, wherein the pyrometer comprises:
a fiber optic light guide cable;
an optic head;
a pressure proof sight glass mounting assembly; and
a signal conditioner.

11. A method for monitoring oxidation in a turbine bucket, comprising the steps of:
inserting a temperature sensor into a turbine;
measuring, with the temperature sensor, a temperature of a reference turbine bucket;
measuring, with the temperature sensor, at least one temperature of a turbine bucket being monitored; and
comparing the measured temperature of the turbine bucket being monitored to the measured temperature of the reference turbine bucket to determine oxidation in the turbine bucket being monitored.

12. The method of claim 11, further comprising the step of:
subtracting the temperature of the reference turbine bucket from the temperature of the turbine bucket being monitored to obtain a relative temperature of the turbine bucket being monitored.

13. The method of claim 12, wherein the relative temperature is monitored to determine when the turbine bucket being monitored needs servicing.

14. The method of claim 13, wherein the turbine bucket being monitored requires servicing when the relative temperature initially increases and then levels off.

15. The method of claim 11, wherein the steps of measuring are performed with at least one temperature sensor.

16. The method of claim 15, wherein the at least one temperature sensor is selected from the group consisting of a pyrometer, a thermocouple, and a thermometer.

17. The method of claim 15, wherein the at least one temperature sensor is a pyrometer.

18. The method of claim 17, wherein the pyrometer comprises:
a fiber optic light guide cable,
an optic head,
a pressure proof sight glass mounting assembly, and
a signal conditioner.

19. The method of claim 11, wherein a temperature of a leading edge of the turbine bucket being monitored is monitored.

20. The method of claim 11, wherein a temperature of a leading edge of the reference bucket is monitored.

21. A method for monitoring a condition of a turbine bucket, the method comprising:
inserting a temperature sensor into a turbine;
measuring a temperature of a leading edge of a reference turbine bucket with the temperature sensor;

measuring at least one temperature of a leading edge of a turbine bucket being monitored with the temperature sensor; and comparing the measured temperature of the leading edge of the turbine bucket being monitored to the measured temperature of the leading edge of the reference turbine bucket to determine the condition of the turbine bucket being monitored.

* * * * *

UNITED STATES PATENT AND TRADEMARK OFFICE
CERTIFICATE OF CORRECTION

PATENT NO.    : 6,579,005 B2
DATED         : June 17, 2003
INVENTOR(S)   : Michael David Ingallinera It is certified that error appears in the above-identified patent and that said Letters Patent is hereby corrected as shown below:

Column 4,
Line 59, "reasonable" has been replaced with -- reasonably --;
Line 60, "than" has been replaced with -- that an --.

Signed and Sealed this

Twenty-first Day of October, 2003

JAMES E. ROGAN
*Director of the United States Patent and Trademark Office*